(12) United States Patent
Chen et al.

(10) Patent No.: US 7,387,986 B2
(45) Date of Patent: *Jun. 17, 2008

(54) VISCOELASTIC SURFACTANT RHEOLOGY MODIFICATION

(75) Inventors: Yiyan Chen, Richmond, TX (US); Carlos Abad, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/249,233

(22) Filed: Oct. 13, 2005

(65) Prior Publication Data

US 2006/0128598 A1 Jun. 15, 2006

Related U.S. Application Data

(63) Continuation-in-part of application No. 11/012,446, filed on Dec. 15, 2004.

(60) Provisional application No. 60/538,025, filed on Jan. 21, 2004.

(51) Int. Cl.
- C09K 8/58 (2006.01)
- C09K 8/68 (2006.01)
- E21B 21/00 (2006.01)

(52) U.S. Cl. ............ 507/260; 507/219; 507/240; 507/241; 507/244; 507/245; 507/261; 507/266; 507/257; 166/308.1

(58) Field of Classification Search ........ 507/240, 507/260

See application file for complete search history.

(56) References Cited

U.S. PATENT DOCUMENTS

| | | | |
|---|---|---|---|
| 3,302,711 A | * 2/1967 | Dilgren | 166/270.2 |
| 3,880,764 A | * 4/1975 | Donham | 507/119 |
| 4,664,818 A | * 5/1987 | Halliday et al. | 507/113 |
| 4,988,450 A | * 1/1991 | Wingrave et al. | 507/118 |
| 5,147,907 A | 9/1992 | Rinck et al. | 524/48 |
| 5,574,120 A | 11/1996 | Heidel et al. | 526/318.2 |
| 5,617,920 A | * 4/1997 | Dovan et al. | 166/295 |
| 5,628,112 A | * 5/1997 | Maslar et al. | 29/846 |
| 5,760,154 A | 6/1998 | Krause et al. | 527/311 |
| 5,979,557 A | 11/1999 | Card et al. | 166/300 |
| 6,063,737 A | * 5/2000 | Haberman et al. | 507/261 |
| 6,133,204 A | * 10/2000 | Newhouse et al. | 507/267 |
| 6,207,780 B1 | 3/2001 | Stockhausen et al. | 526/287 |
| 6,258,859 B1 | 7/2001 | Dahayanake et al. | 516/77 |

(Continued)

FOREIGN PATENT DOCUMENTS

WO    WO 9856497 A1 * 12/1998

OTHER PUBLICATIONS

U.S. Appl. No. 10/994,664—Viscoelastic Surfactant Rheology Modification.

Primary Examiner—Randy Gulakowski
Assistant Examiner—John J Figueroa
(74) Attorney, Agent, or Firm—Thomas O. Mitchell; Dave Cate; Robin Nava

(57) ABSTRACT

A method for shortening the shear recovery time of cationic, zwitterionic, and amphoteric viscoelastic surfactant fluid systems by adding an effective amount of an amphiphilic polymeric rheology enhancer containing at least one portion that is a partially hydrolyzed polyvinyl ester or partially hydrolyzed polyacrylate. The rheology enhancer also increases fluid viscosity and very low rheology enhancer concentration is needed. Preferred surfactants are betaines and quaternary amines. The fluids are useful in oilfield treatments, for example fracturing and gravel packing.

30 Claims, 5 Drawing Sheets

U.S. PATENT DOCUMENTS

| | | | |
|---|---|---|---|
| 6,348,436 B1 * | 2/2002 | Langlois et al. | 507/112 |
| 6,435,277 B1 | 8/2002 | Qu et al. | 166/281 |
| 6,605,570 B2 * | 8/2003 | Miller et al. | 507/211 |
| 6,703,352 B2 | 3/2004 | Dahayanake et al. | 507/241 |
| 2002/0147114 A1 | 10/2002 | Dobsen, Sr. et al. | 507/242 |
| 2003/0134751 A1 | 7/2003 | Lee et al. | 507/200 |
| 2005/0067165 A1 | 3/2005 | Cawiezel et al. | 166/307 |
| 2005/0137095 A1 | 6/2005 | Cawiezel et al. | 507/240 |

* cited by examiner

VISCOELASTIC SURFACTANT RHEOLOGY MODIFICATION

CROSS REFERENCE TO RELATED APPLICATION

This application is a Continuation in Part of prior copending application Ser. No. 11/012,446, filed Dec. 15, 2004, entitled "Viscoelastic Surfactant Rheology Modification", which claimed the benefit of U.S. Provisional Patent Application No. 60/538,025, entitled "Additive for Viscoelastic Fluid", filed Jan. 21, 2004.

BACKGROUND OF THE INVENTION

The invention relates to rheology enhancers for viscoelastic surfactant fluid systems (VES's). More particularly it relates to selection and optimization of rheology enhancers for fluid systems to be used over broad ranges of salinity and temperature. Most particularly it relates to rheology enhancers to shorten shear recovery times and increase the viscosity of VES's for use in oilfield treatment fluids.

Certain surfactants, when in aqueous solution, form viscoelastic fluids. Such surfactants are termed "viscoelastic surfactants", or "VES's". Other components, such as additional VES's, co-surfactants, buffers, acids, solvents, and salts, are optional or necessary (depending upon the specific VES fluid system used) and perform such functions as increasing the stability (especially thermal stability) or increasing the viscosity of the systems by modifying and/or stabilizing the micelles; all the components together are called a viscoelastic surfactant system. Not to be limited by theory, but many viscoelastic surfactant systems form long rod-like or worm-like micelles in aqueous solution. Entanglement of these micelle structures gives viscosity and elasticity to the fluid. For a fluid to have good viscosity and elasticity under given conditions, proper micelles must be formed and proper entanglement is needed. This requires the surfactant's structure to satisfy certain geometric requirements and the micelles to have sufficient length or interconnections for adequate entanglements.

Many chemical additives are known to improve the rheological behavior (greater viscosity and/or greater stability and/or greater brine tolerance and/or lower shear sensitivity and/or faster rehealing if micelles are disrupted, for example by shear). Such materials are typically called co-surfactants, rheology modifiers, or rheology enhancers, etc., and typically are alcohols, organic acids such as carboxylic acids and sufonic acids, sulfonates, and others. We shall use the term rheology enhancers here. Such materials often have different effects, depending upon their exact composition and concentration, relative to the exact surfactant composition (for example hydrocarbon chain lengths of groups in the surfactant and co-surfactant) and concentration. For example, such materials may be beneficial at some concentrations and harmful (lower viscosity, reduced stability, greater shear sensitivity, longer rehealing times) at others.

In particular, many VES fluid systems exhibit long viscosity recovery times after experiencing prolonged high shear. Slow recovery negatively impacts drag reduction and proppant transport capability, which consequently lead to undesirably high treating pressures and risks of near wellbore screen-outs. Although additives are known that can shorten VES shear recovery times and increase viscosities, there is a need for additional simple, inexpensive rheology enhancers.

SUMMARY OF THE INVENTION

One embodiment is an oilfield treatment method consisting of preparing and injecting down a well a fluid containing a viscoelastic surfactant selected from zwitterionic, amphoteric, and cationic surfactants and mixtures of those surfactants, and a rheology enhancer in a concentration sufficient to shorten the shear recovery time of the fluid, in which the rheology enhancer is selected from the group consisting of an amphiphilic polymer, for example a homopolymer or copolymer containing at least a portion consisting of partially hydrolyzed polyvinyl ester, partially hydrolyzed polyacrylate or sulfonate-containing polymers. The rheology enhancer may also increase the viscosity of the fluid.

The viscoelastic surfactant system may contain a zwitterionic surfactant, for example a surfactant or mixture of surfactants having the formula:

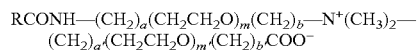

in which R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$. The zwitterionic surfactant may have the betaine structure:

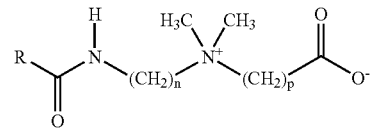

in which R is a hydrocarbon group that may be branched or straight chained, aromatic, aliphatic or olefinic and has from about 14 to about 26 carbon atoms and may contain an amine; n=about 2 to about 4; and p=1 to about 5, and mixtures of these compounds. The betaine may be oleylamidopropyl betaine or erucylamidopropyl betaine and may contain a co-surfactant.

The viscoelastic surfactant system may contain a cationic surfactant, for example a surfactant or mixture of surfactants having the structure:

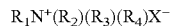

in which $R_1$ has from about 14 to about 26 carbon atoms and may be branched or straight chained, aromatic, saturated or unsaturated, and may comprise a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion; and mixtures of these compounds. As a further example, $R_1$ contains from about 18 to about 22 carbon atoms and may contain a carbonyl, an amide, or an amine; $R_2$, $R_3$, and $R_4$ contain from 1 to about 3 carbon atoms, and $X^-$ is a halide. As a further example, $R_1$ comprises from about 18 to about 22 carbon atoms and may comprise a carbonyl, an amide, or an amine, and $R_2$, $R_3$, and $R_4$ are the same as one another and comprise from 1 to about 3 carbon atoms. The cationic viscoelastic surfactant system optionally contains amines, alcohols, glycols, organic salts, chelating agents, solvents, mutual solvents, organic acids, organic acid salts, inorganic salts, oligomers, polymers, co-polymers, and mixtures of said materials, present at a concentration of between about 0.01 and about 10 percent, for example at a concentration of between about 0.01 and about 1 percent. The amphoteric surfactant may be, for example, an amine oxide, for example an amidoamine oxide.

The rheology enhancer is present in the fluid at a concentration of from about 0.0001% to about 0.5%, for example at a concentration of from about 0.0001% to about 0.05%.

The rheology enhancer contains, as one example, a partially hydrolyzed polyvinyl acetate having a percent hydrolysis between about 10% and about 95%. The molecular weight is, for example, from about 500 to about 100,000,000. Other esters may be used, for example $C_2$ to $C_{11}$ esters (i.e. the partially hydrolyzed ethyl to undecyl esters of polyvinyl alcohol). As another example, the rheology enhancer contains partially hydrolyzed polyvinyl acetate having a percent hydrolysis between about 30% and about 88%, and the molecular weight is, for example, from about 500 to about 100,000,000.

The rheology enhancer may also contain partially hydrolyzed polyacrylates, or partially hydrolyzed polymethacrylates or the like, for example, but not limited to, partially hydrolyzed polymethyl acrylate, partially hydrolyzed polyethyl acrylate, partially hydrolyzed polybutyl acrylate, partially hydrolyzed polymethyl methacrylate, and mixtures of these polymers. The rheology enhancer may also contain sulfonate-containing polymers.

The amphiphilic polymer or copolymer rheology enhancer may be linear, branched, or have a comb, dendritic, brush, graft, star or star-branched shape. It may contain repeating units other than vinyl esters, acrylates, and the corresponding hydrolysed groups. The other repeating units are, for example, polyethylene oxide/polyethylene glycol or polypropylene oxide/polypropylene glycol. The copolymers may be random, alternating, or block copolymers.

The fluid further may optionally contain an acid selected from hydrochloric acid, hydrofluoric acid, formic acid, acetic acid, lactic acid, glycolic acid, polylactic acid, polyglycolic acid, sulfamic acid, malic acid, citric acid, tartaric acid, maleic acid, methylsulfamic acid, chloroacetic acid, and mixtures of these acids.

Another embodiment is a method of shortening the shear recovery time of a viscoelastic surfactant based fluid containing a viscoelastic surfactant selected from zwitterionic, amphoteric, and cationic surfactants and mixtures of those surfactants, consisting of adding a rheology enhancer, in a concentration sufficient to shorten the shear recovery time of the fluid, selected from the amphiphilic polymers described above.

Yet another embodiment is a composition containing a viscoelastic surfactant selected from zwitterionic, amphoteric, and cationic surfactants and mixtures of those surfactants; and a rheology enhancer in a concentration sufficient to shorten the shear recovery time of the fluid, selected from the partially hydrolyzed polyvinyl acetates (or other esters) and partially hydrolyzed polyacrylates described above.

In addition to oilfield uses, the rheology enhancer of the invention may be used in household and industrial cleaners, agricultural chemicals, personal hygiene products, cosmetics, pharmaceuticals, printing and other fields.

DETAILED DESCRIPTION OF THE INVENTION

Figure 1:
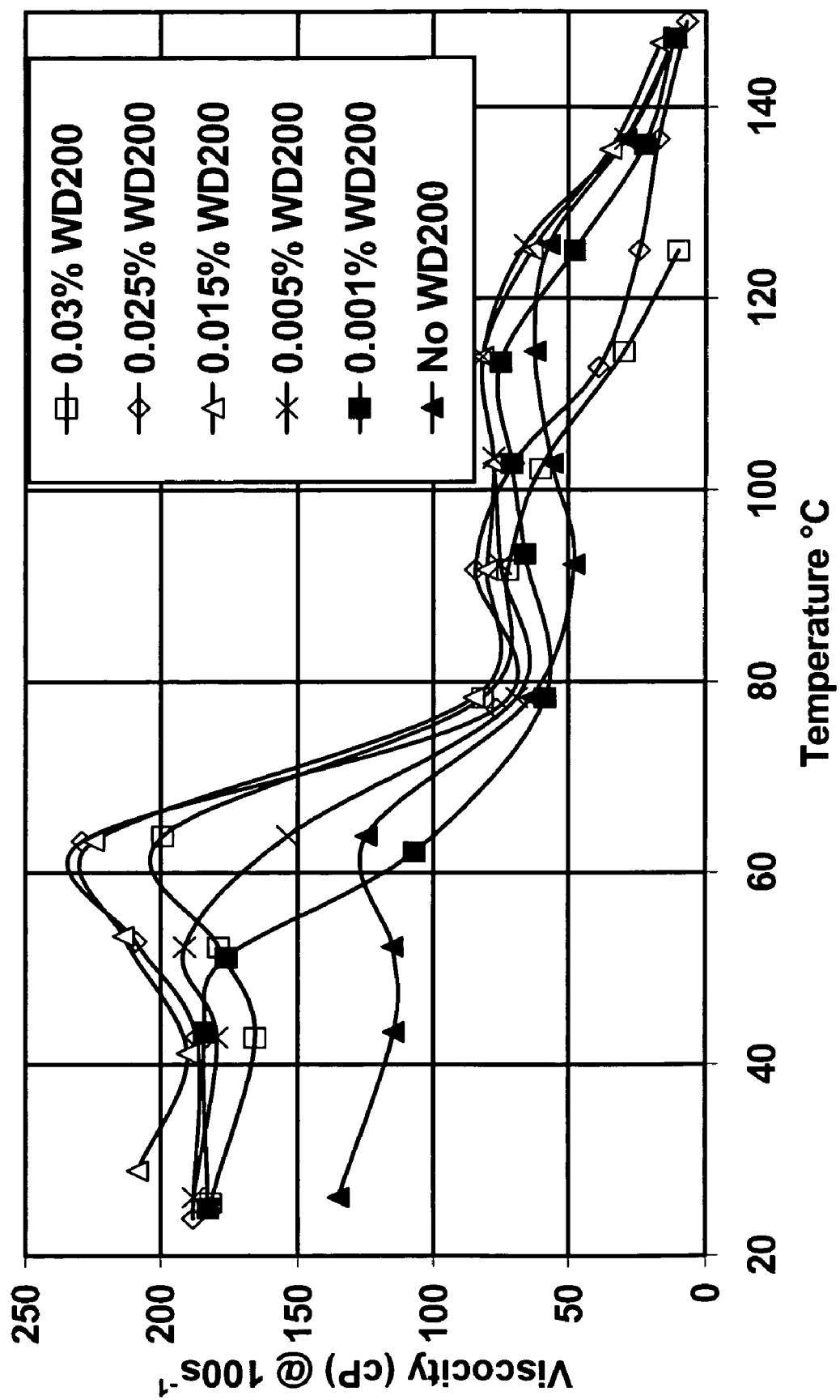
FIG. 1 shows viscosity as a function of temperature of fluids having one concentration of a viscoelastic surfactant and various concentrations of an amphiphilic rheology enhancer of the invention.

When fluids are viscosified by the addition of viscoelastic surfactant systems, the viscosity increase is believed to be due to the formation of micelles, for example worm-like micelles, which entangle to give structure to the fluid that leads to the viscosity. In addition to the viscosity itself, an important aspect of a fluid's properties is the degree and rate of viscosity-recovery or re-healing when the fluid is subjected to high shear and the shear is then reduced. For VES fluids, shear may disrupt the micelle structure, after which the structure reforms. Controlling the degree and rate of reassembling (re-healing) is necessary to maximize performance of the surfactant system for different applications. For example, in hydraulic fracturing it is critical for the fluid to regain viscosity as quickly as possible after exiting the high-shear region in the tubulars and entering the low-shear environment in the hydraulic fracture. On the other hand, it is beneficial in coiled tubing cleanouts to impart a slight delay in regaining full viscosity in order to "jet" the solids more efficiently from the bottom of the wellbore into the annulus. Once in the annulus the regained viscosity ensures that the solids are effectively transported to the surface.

Viscoelastic surfactant fluid systems have been shown to have excellent Theological properties for hydraulic fracturing applications; however, shear recovery time, not fluid viscosity, often dictates the minimum concentration of surfactant required. For example, a fluid made with a certain concentration of surfactant may show adequate viscosity for fracturing at a given temperature, but the minimal usable concentration may be high due to slow shear recovery with a lower concentration. An acceptable shear recovery time is considered to be 15 seconds. A time longer than 15 seconds will negatively impact drag reduction and proppant transport. Shortening the viscosity-recovery time makes it possible to use VES fluid systems that would otherwise not be suitable in many applications. In addition, when a rheology modifier also increases fluid viscosity, then less surfactant is needed to provide a given viscosity. Examples of rheology enhancers are given in U.S. patent application Ser. No.

10/994,664, which is assigned to the same assignee as the present invention and which is hereby incorporated in its entirety.

We have found that certain simple additives, when included in certain viscoelastic surfactant fluid systems (such as cationic, amphoteric, and zwitterionic viscoelastic surfactant fluid systems, especially betaine viscoelastic surfactant fluid systems), in the proper concentration relative to the surfactant active ingredient, significantly shorten the shear recovery time of the systems, increasing the viscosity at the same time. In many cases, the shear recovery is nearly instantaneous.

We have found new classes of chemical additives that are effective for shortening the rehealing time after high shear, and increasing the viscosity of VES systems at a given temperature, making the fluids more useful for many purposes, such as, but not limited to, uses as oilfield treatment fluids, especially stimulation fluids, most especially hydraulic fracturing fluids. We will call these materials "rheology enhancers" here. The rheology enhancers extend the conditions under which the VES systems can be used, and reduce the amount of surfactant needed, which in turn reduces the cost and improves clean-up.

Suitable rheology enhancers of the invention include amphiphilic polymers (having some polar groups on an otherwise water-insoluble backbone, or having side chains that themselves are water soluble backbones, and/or having some insoluble groups or segments on the backbone or on the side chain(s), or on both, so that the polymer is soluble in both water and organic solvents and has an affinity to both polar and non-polar solvents), for example polymers or copolymers containing partially hydrolyzed polyvinyl acetates (PHPVA's) consisting of or containing the following structure or structure segment:

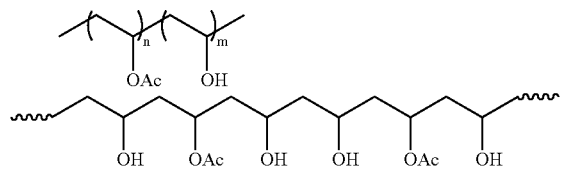

typically abbreviated as in the first structure shown, with [m/(n+m)] 100=% hydrolysis, although actually having the hydrolyzed sites randomly distributed, as shown in the second structure. (This structure is also sometimes known as partially hydrolyzed polyvinyl alcohol or as polyvinyl alcohol/polyvinyl acetate copolymer.) Examples are obtained from Synthomer Limited, Harlow, Essex, United Kingdom, under the trade names Alcotex WD100 and Alcotex WD200. Alcotex WD200 is an aqueous solution containing approximately 20% of a copolymer containing polyvinyl acetate that is approximately 42-45% hydrolyzed, having an average molecular weight of about 25,000; it contains less than 2% methanol. For shortening of shear recovery time, suitable partially hydrolyzed polyvinyl acetates (PHPVA's) or PHPVA-containing copolymers are from about 10% to about 95% hydrolyzed and have a molecular weight of from about 500 to about 100,000,000. For increasing fluid system rheology, suitable PHPVA's or PHPVA-containing copolymers are from about 30% to about 88% hydrolyzed and have a molecular weight of from about 5000 to about 100,000,000. Other partially hydrolyzed polyvinyl esters (sometimes referred to as partially hydrolyzed polyvinyl alcohols) may be used, for example those obtained from $C_2$ to $C_{11}$ esters (i.e. the partially hydrolyzed ethyl to undecyl esters of polyvinyl alcohols). It should be understood that when we refer to polymers, we include copolymers.

Other suitable amphiphilic polymers include partially hydrolyzed polyacrylates, or partially hydrolyzed polymethacrylates or the like, for example, but not limited to, partially hydrolyzed polymethyl acrylate, partially hydrolyzed polyethyl acrylate, partially hydrolyzed polybutyl acrylate, partially hydrolyzed polymethyl methacrylate, and mixtures of these polymers. The rheology enhancer may also contain sulfonate-containing polymers, such as polystyrene sulfonates and condensation products of naphthalene sulfonates.

Other polymers that may be used as the rheology enhancer of the invention, or may be part of the amphiphilic polymeric rheology enhancer of the invention, include those described in U.S. Pat. No. 5,760,154 (except those containing polysaccharides) and U.S. Pat. No. 5,147,907 (the portion not containing dextrins). Also useful as part of all of the rheology enhancer are polymers shown in U.S. Pat. No. 5,574,124 (such as terpolymers of acrylic acid, maleic anhydride and vinyl acetate). Also useful as part of all of the rheology enhancer are polymers shown in U.S. Pat. No. 6,207,780 (such as polymers built up of a) monoethylenically unsaturated dicarboxylic acids and/or their salts, b) monoethylenically unsaturated monocarboxylic acids and/or their salts, c) monounsaturated monomers which, after hydrolysis or saponification, can be converted into monomers having a hydroxyl group covalently bonded at the C—C-chain, d) monoethylenically unsaturated sulfonic acid groups or sulfate groups-containing monomers, and optionally e) further radically copolymerizable monomers).

The amphiphilic polymer or copolymer rheology enhancer may be linear, branched, or have a comb, dendritic, brush, graft, star or star-branched shape. It may contain repeating units other than vinyl esters, vinyl acrylates, and the corresponding hydrolysed groups. The other repeating units are, for example, polyethylene oxide/polyethylene glycol or polypropylene oxide/polypropylene glycol. The copolymers may be random, alternating, or block copolymers.

Suitable concentrations (in the final fluid system) are from about 0.0001% to about 0.5%, for example from about 0.0001% to about 0.05%. These are very low concentrations for rheology enhancers.

The rheology enhancers of the present invention give the desired results with cationic, amphoteric, and zwitterionic viscoelastic surfactant systems. They have been found to be particularly effective with certain zwitterionic surfactants. In general, particularly suitable zwitterionic surfactants have the formula:

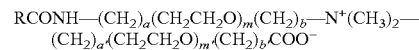

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$.

Preferred zwitterionic surfactants include betaines. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U.S.A.) it is called Miratatine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is available from Rhodia and contains an erucic acid amide group (including a $C_{21}H_{41}$ alkene tail group) and is approximately 40% active ingredient, with the remainder being substantially water, sodium chloride, and isopropanol. VES systems, in particular BET-E-40, optionally contain about 1% of a condensation product of a naphthalene sulfonic acid, for example sodium polynaphthalene sulfonate, as a rheology modifier, as described in U.S. Patent Application Publication No. 2003-0134751. The surfactant in BET-E-40 is also shown below; one chemical name is erucylamidopropyl betaine. As-received concentrates of BET-E-40 were used in the experiments reported below, where they will be referred to as "VES" and "VES-1". BET surfactants, and other VES's that are suitable for the present Invention, are described in U.S. Pat. No. 6,258,859. According to that patent, BET surfactants make viscoelastic gels when in the presence of certain organic acids, organic acid salts, or inorganic salts; in that patent, the inorganic salts were present at a weight concentration up to about 30%. Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS), also shown below. Other suitable co-surfactants include, for example those having the SDBS-like structure in which x=5-15; preferred co-surfactants are those in which x=7-15. Still other suitable co-surfactants for BET-O-30 are certain chelating agents such as trisodium hydroxyethylethylenediamine triacetate. The rheology enhancers of the present invention may be used with viscoelastic surfactant fluid systems that contain such additives as co-surfactants, organic acids, organic acid salts, and/or inorganic salts.

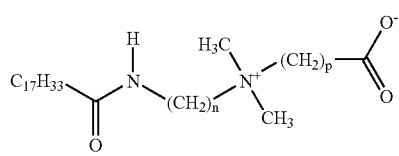

Surfactant in BET-O-30 (when n = 3 p = 1)

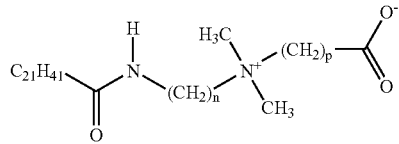

Surfactant in BET-E-40 (when n = 3 p = 1)

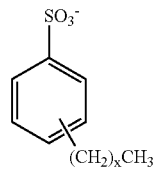

SDBS (when x = 11 and the counterion is Na⁺)

Preferred embodiments of the present invention use betaines; most preferred embodiments use BET-E-40. Although experiments have not been performed, it is believed that mixtures of betaines, especially BET-E-40, with other surfactants are also suitable. Such mixtures are within the scope of embodiments of the invention.

Other betaines that are suitable include those in which the alkene side chain (tail group) contains 17-23 carbon atoms (not counting the carbonyl carbon atom) which may be branched or straight chained and which may be saturated or unsaturated, n=2-10, and p=1-5, and mixtures of these compounds. More preferred betaines are those in which the alkene side chain contains 17-21 carbon atoms (not counting the carbonyl carbon atom) which may be branched or straight chained and which may be saturated or unsaturated, n=3-5, and p=1-3, and mixtures of these compounds. These surfactants are used at a concentration of about 0.5 to about 10%, preferably from about 1 to about 5%, and most preferably from about 1.5 to about 4.5%.

Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference.

Examples of suitable cationic viscoelastic surfactants include cationic surfactants having the structure:

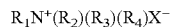

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and X⁻ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4) X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, co-polymers, and mixtures of these members. They may also contain performance enhancers, such as viscosity enhancers, for example polysulfonates, for example polysulfonic acids, as described in copending U.S. Patent Application Publication No. 2003-0134751 which has a common Assignee as the present application and which is hereby incorporated by reference.

Another suitable cationic VES is erucyl bis(2-hydroxyethyl) methyl ammonium chloride, also known as (Z)-13 docosenyl-N-N-bis(2-hydroxyethyl) methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; and cetylamino, N-octadecyl pyridinium chloride.

Many fluids made with viscoelastic surfactant systems, for example those containing cationic surfactants having structures similar to that of erucyl bis(2-hydroxyethyl) methyl ammonium chloride, inherently have short re-heal times and the rheology enhancers of the present invention may be not needed except under special circumstances, for example at very low temperature.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Patent Application Nos. 2002/0147114, 2005/0067165, and 2005/0137095, for example amidoamine oxides. These four references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

Viscoelastic surfactant fluids, for example those used in the oilfield, may also contain agents that dissolve minerals and compounds, for example in formations, scale, and filtercakes. Such agents may be, for example, hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, for example trisodium hydroxyethylethylenediamine triacetate, and salts of these acids and mixtures of these acids and/or salts. For sandstone treatment, the fluid also typically contains a hydrogen fluoride source. The hydrogen fluoride source may be HF itself or may be selected from ammonium fluoride and/or ammonium bifluoride or mixtures of the two; when strong acid is present the HF source may also be one or more of polyvinylammonium fluoride, polyvinylpyridinium fluoride, pyridinium fluoride, imidazolium fluoride, sodium tetrafluoroborate, ammonium tetrafluoroborate, and salts of hexafluoroantimony. When the formation-dissolving agent is a strong acid, the fluid preferably contains a corrosion inhibitor. The fluid optionally contains chelating agents for polyvalent cations, for example especially aluminum, calcium and iron (in which case the agents are often called iron sequestering agents) to prevent their precipitation. Some of the formation-dissolving agents just described are such chelating agents as well. Chelating agents are added at a concentration, for example, of about 0.5% (of active ingredient). When VES fluids contain strong acids, they are typically not gelled and display low viscosity; when the pH increases as the acid reacts with the mineral, the system gels and the viscosity increases. Such a fluid may be called a viscoelastic diverting acid. Schlumberger Technology Corporation markets viscoelastic diverting agents under the trademark VDA®, a registered trademark of Schlumberger Technology Corporation. The rheology enhancers of the present invention may be used in viscoelastic surfactant fluid systems containing acids and chelating agents.

Preparation and use (mixing, storing, pumping, etc.) of the improved VES fluid systems containing rheology enhancers of the invention are the same as for such fluids without the rheology enhancers. For example, the order of mixing is not affected by including these rheology enhancers. Optionally, the rheology enhancers may be incorporated in surfactant concentrates (provided that they do not affect component solubilities or concentrate freezing points) so that the concentrates can be diluted with an aqueous fluid to make VES systems. This maintains the operational simplicity of the VES systems. As is normally the case in fluid formulation, laboratory tests should be run to ensure that the additives do not affect, and are not affected by, other components in the fluid (such as salts, for example). In particular, the rheology enhancers of the present invention may be used with other rheology modifiers. Adjusting the concentrations of surfactant, rheology enhancer, and other fluid components to account for the effects of other components is within the scope of the invention.

The fluid may be used, for example in oilfield treatments. As examples, the fluid may be used as a pad fluid and/or as a carrier fluid and/or as a diverter in hydraulic fracturing, as a carrier fluid for lost circulation control agents, as a carrier fluid for gravel packing, and as a diverter or a main fluid in acidizing and acid fracturing. The fluids may also be used in other industries, such as in household and industrial cleaners, agricultural chemicals, personal hygiene products, cosmetics, pharmaceuticals, printing and in other fields.

The optimal concentration of a given rheology enhancing additive of the invention for a given choice of VES surfactant fluid system at a given concentration and temperature, and with given other materials present, can be determined by simple experiments. The total viscoelastic surfactant concentration must be sufficient to form a viscoelastic gel under conditions at which the surfactants have sufficient aggregation tendency. The appropriate amounts of surfactant and rheology enhancer are those necessary to achieve the desired viscosity and shear recovery time as determined by experiment. Again, tolerance for, and optimal amounts of other additives may also be determined by simple experiment. In general, the amount of surfactant (as active ingredient) is from about 0.15% to about 3%. Commercially available surfactant concentrates may contain some materials that are themselves rheology enhancers, although they may be present for example for concentrate freezing point depression, so the amount of surfactant and rheology enhancer used is determined for the specific concentrate used. Mixtures of surfactants and/or mixtures of rheology enhancers (including mixtures of more than one rheology enhancer of the invention, and mixtures of one or more rheology enhancers of the invention with one or more other rheology enhancers) may be used. Mixtures of surfactants may include surfactants that are not viscoelastic surfactants when not part of a viscoelastic surfactant system. All mixtures are tested and optimized; for example, too much total rheology enhancer may decrease the beneficial effects.

EXPERIMENTAL

The present invention can be further understood from the following examples. In the examples, the cationic surfactants Cat A and Cat B were cationic surfactant formulations containing the same cationic surfactant $R_1N^+(R_2)(R_3)(R_4)$ $X^-$ (in which $R_1$ has from about 18 to about 22 carbon atoms and contains an amide; $R_2$, $R_3$, and $R_4$ are the same short-chained saturated alkyl group, and $X^-$ is a halide). Cat A and Cat B contain differing choices and/or amounts of the types of additives commonly obtained in commercially available as-received surfactant concentrates, including amines having the structure $R_1N(R_2)(R_3)$ in which $R_1$, $R_2$, and $R_3$ are the same as for the surfactant. The zwitterionic surfactants Zw A and Zw B are BET-E-40 and BET-E-40 containing about 1% polynaphthalene sulfonate respectively. The concentrations given for the surfactants are for the as-received concentrates.

EXAMPLE 1

The table below shows the shear recovery times observed when various amounts of WD200 were added to four surfactant systems. In these experiments, approximately 200 mL of already-mixed VES fluid was sheared at no less than 10,000 rpm for no less than 30 seconds and no more than 1 minute in a 1 L Waring blender. The shearing was stopped and timing was begun. The fluid was poured back and forth between a beaker and the blender cup and the fluid recovery was characterized by two times, referred to as the initial and final recovery times; both were estimated by visual observation. The initial fluid recovery time was the time at which fluid "balling" occurred (when the fluid showed the first signs of elasticity as indicated by the fluid taking a longer time to achieve a flat surface in the receiving beaker when poured). The final fluid recovery time was the time at which fluid "lipping" occurred. The fluid "lips" when inclining the upper beaker or cup containing the fluid does not result in fluid flow into the container below, but rather the formation of a "lip", and pulling the container back to a vertical position pulls back the "lip". In fracturing fluid practice, "lipping" is used to estimate when the fluid reaches its near-equilibrium elasticity. The table shows the final fluid recovery times for several systems and shows that 0.015% of WD200 reduces the shear recovery times of two different cationic surfactant systems from over five minutes to 6 seconds or to too short to measure, and 0.005% WD200 reduces the shear recovery times of two different zwitterionic surfactants systems to too short to measure.

| Surfactant System | Concentration | WD200 concentration | Shear Recovery Time |
|---|---|---|---|
| Cat A | 1% | 0 | >5 min |
|  |  | 0.015% | 6 sec |
| Cat B | 1% | 0 | >5 min |
|  |  | 0.015% | 0 sec |
| Zw B | 1% | 0 | >1 hour |
|  |  | 0.005% | 0 sec |
| Zw A | 1% | 0 | >1 hour |
|  |  | 0.005% | 0 sec |

EXAMPLE 2

In addition to dramatically shortening shear recovery times at very low concentrations, the rheology enhancer of the invention also increases fluid system viscosity. Varying amounts of WD200 were added to fluids made with 4.5% of as-received surfactant concentrate Zw A without added salt. The viscosity measured with a Fann 50 at 100 sec$^{-1}$ was measured at various temperatures. The results are shown in FIG. 1. At low temperatures, the viscosity was increased by all concentrations of WD200 tested. At higher temperatures, the higher WD200 concentrations lowered the viscosity (although they still shortened shear recovery time). For this concentration of this surfactant, about 0.015% of this rheology enhancer is optimal for increasing the viscosity over the entire temperature range. For other surfactant/rheology enhancer combinations and other surfactant concentrations, the optimal rheology enhancer concentration may be different. Similarly, if optimization at a certain temperature is desired, another surfactant/rheology enhancer combination and/or other surfactant and rheology enhancer concentrations may be optimal. This is determined by simple experiments like those of this example.

EXAMPLE 3

Figure 2:
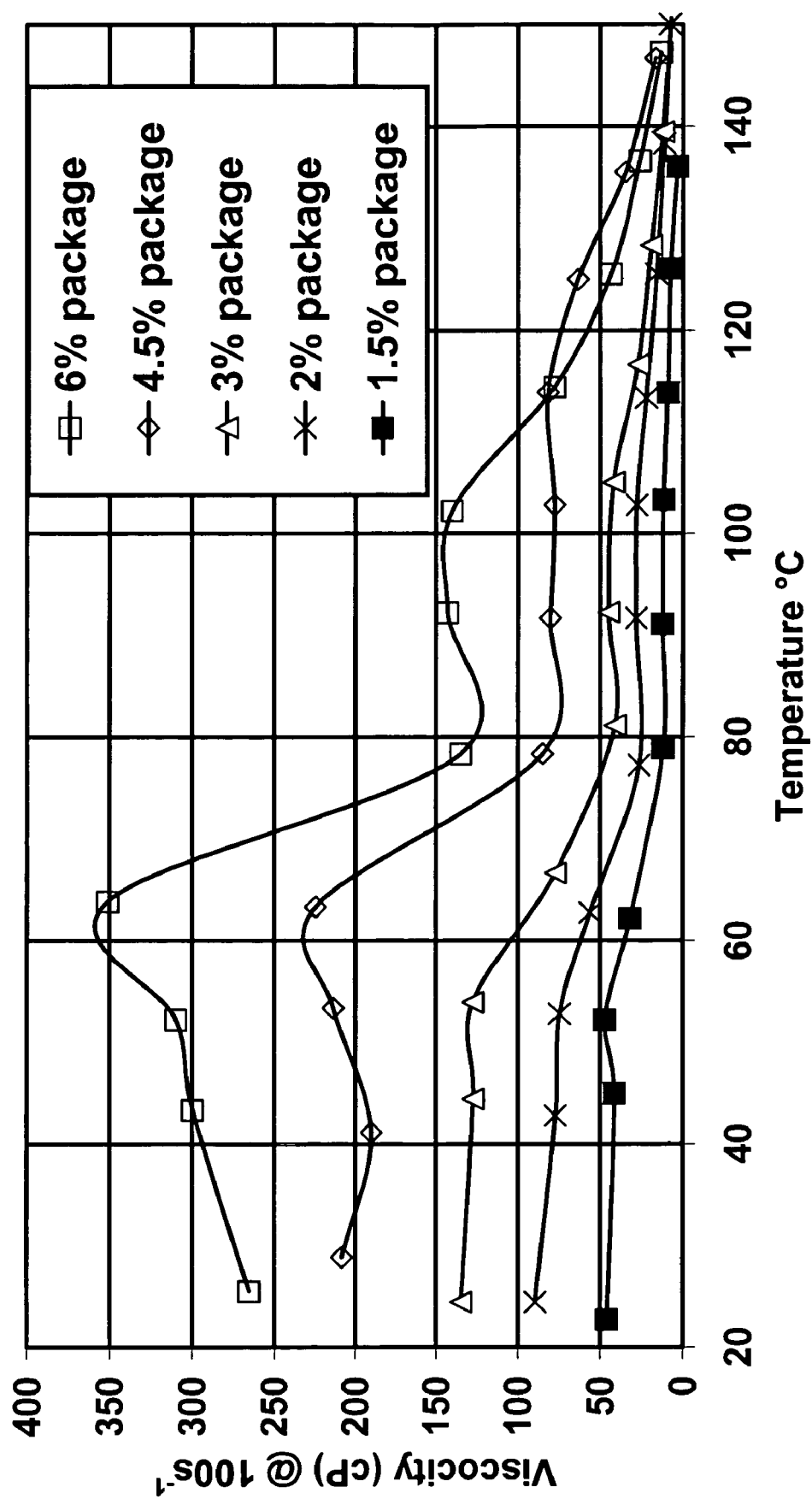
FIG. 2 shows viscosity as a function of temperature of fluids containing varying amounts of a fixed ratio of a viscoelastic surfactant and an amphiphilic rheology enhancer of the invention.

Because the rheology enhancer of the invention is suitable over a broad range of conditions, it is advantageous to prepackage a concentrate containing a viscoelastic surfactant and a rheology enhancer (or more than one of each) at a fixed concentration ratio. FIG. 2 shows the effect of varying the total concentration of one such package (as-received Zw A with WD200 added so that the ratio of surfactant to WD200 is 300) at varying concentrations.

EXAMPLE 4

Figure 3:
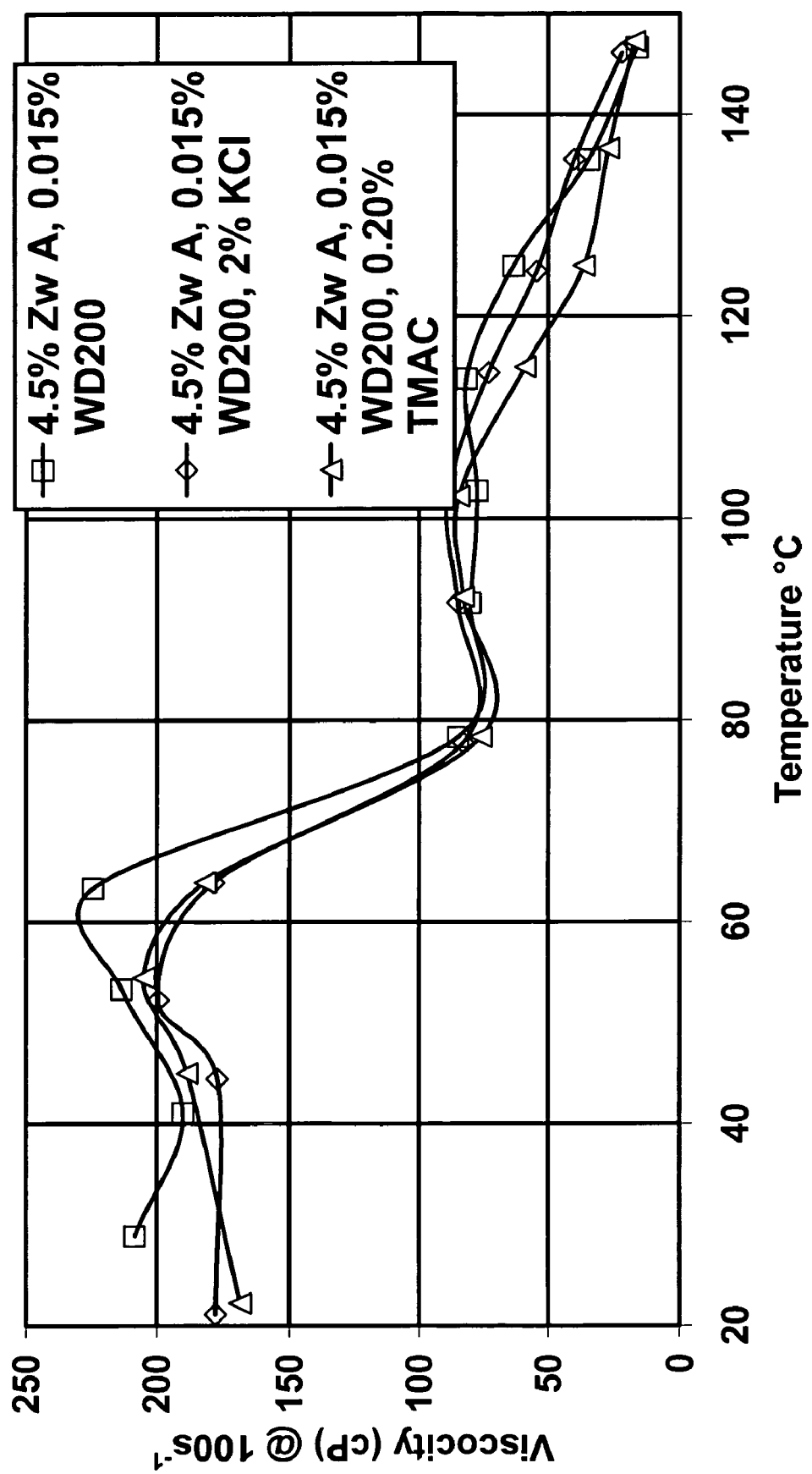
FIG. 3 shows viscosity as a function of temperature of a fluid containing a viscoelastic surfactant and an amphiphilic rheology enhancer of the invention and different clay stabilizers. TMAC is tetramethylammonium chloride.

This system gels without added salt. Fluids injected into subterranean formations typically contain salts as clay stabilizers. A particularly suitable formulation, 4.5% w A with 0.015% WD200, was tested with no added salt and with two common clay stabilizers: 2% KCl and 0.2% tetramethylammonium chloride (TMAC). FIG. 3 shows that all three had essentially the same viscosity vs. temperature profiles at 100 sec$^{-1}$.

EXAMPLE 5

Figure 4:
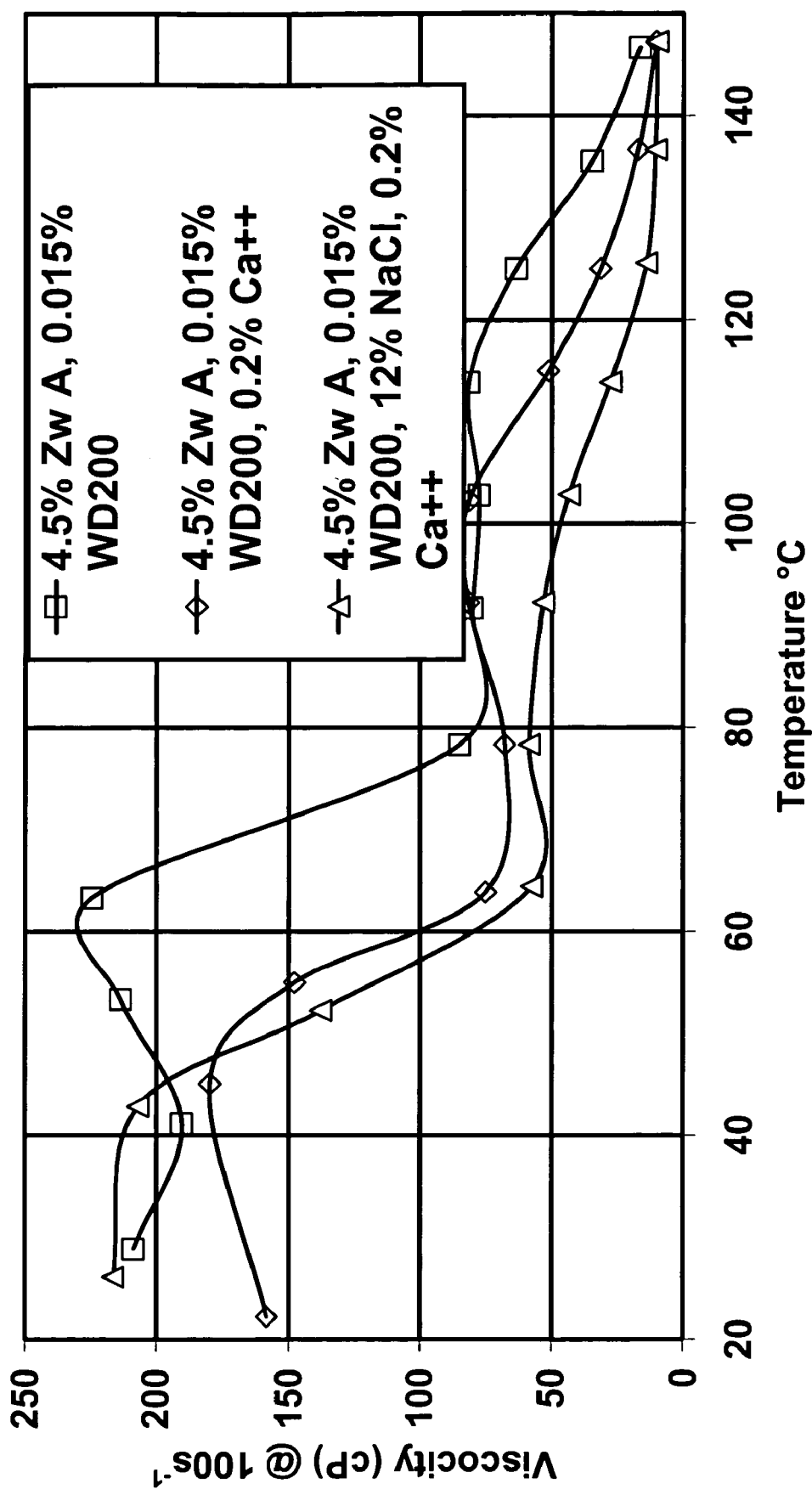
FIG. 4 shows viscosity as a function of temperature of a fluid containing a viscoelastic surfactant and an amphiphilic rheology enhancer of the invention and high salt brines.

The water quality used to make up fluids in the oilfield, for example fracturing fluids, is a concern in many areas of the world. It is difficult to obtain clean water in some locations. Water with high hardness and other contaminants is frequently used. Produced water, typically high in calcium and chloride, is generated on site as a waste product and its disposal may be expensive. It is very advantageous if a fracturing fluid can be made with any water available, including produced water, and reliably gels without concerns about the water quality. Viscoelastic surfactant/rheology enhancer combinations of the invention, for example a Zw A/WD200 formulation containing 4.5% as-received Zw A and 0.015% WD200, show good compatibility with produced water. FIG. 4 shows that the fluid viscosity is still good when the calcium concentration reaches 2000 ppm, even in combination with a high concentration of NaCl, simulating the major salinity contributors in typical produced water.

EXAMPLE 6

Figure 5:
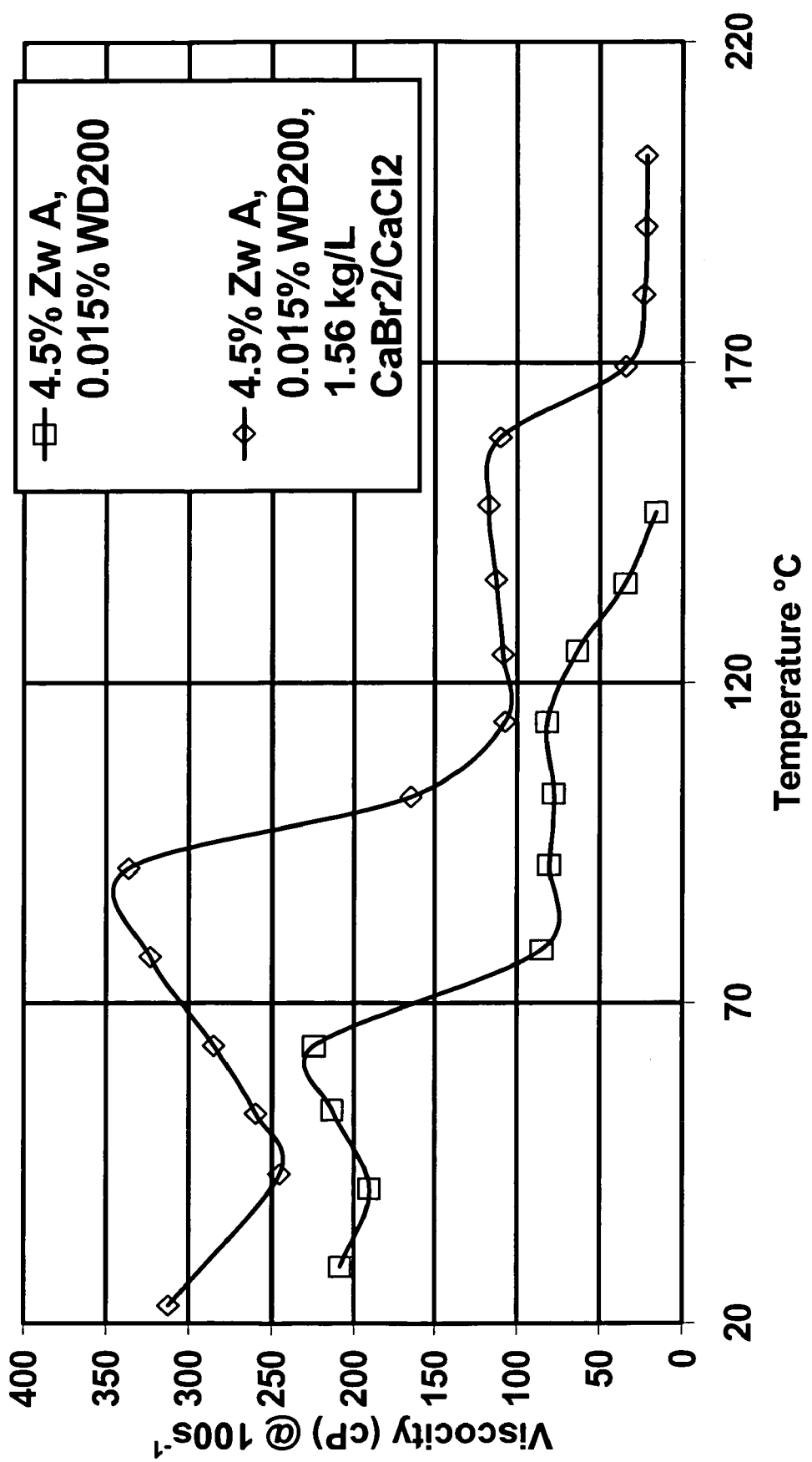
FIG. 5 shows viscosity as a function of temperature of a fluid containing a viscoelastic surfactant and an amphiphilic rheology enhancer of the invention and a high-density brine.

In wells that need pressure control, or for gravel pack applications, a gel in a high-density brine is commonly desired. Viscoelastic surfactant/rheology enhancer combinations of the invention, for example a Zw A/WD200 formulation containing 4.5% as-received Zw A and 0.015% WD200, show excellent compatibility with heavy brine. As an example, shown in FIG. 5, not only was the fluid viscosity performance excellent in a 13 ppg (1.56 kg/L) $CaBr_2/CaCl_2$ brine, but also the heavy brine increased the viscosity and thermal stability (temperature limit) of the fluid system.

We claim:

1. An oilfield treatment method comprising:
   a. viscosifying a fluid with a viscoelastic surfactant system having an entangled micelle structure selected from at least one of zwitterionic, amphoteric, and cationic surfactants and mixtures thereof, said entangled micelle structure being disrupted by application of shear and having a shear recovery time for said micelle structure to reheal wherein the viscosified fluid has a rheology comprising a viscosity recovery time at relatively low shear conditions following a reduced viscosity from high shear conditions;
   b. adding to the fluid a rheology enhancer in the fluid in a concentration sufficient to shorten the viscosity recovery time of the viscoelastic recovery system, said rheology enhancer being a polymer comprising at least one portion selected from partially hydrolyzed polyvinyl esters; and
   c. injecting said fluid down a well.

2. The method of claim 1 further wherein said rheology enhancer increases the viscosity of said fluid.

3. The method of claim 1 wherein said viscoelastic surfactant comprises a zwitterionic surfactant.

4. The method of claim 1 wherein said zwitterionic surfactant comprises a surfactant or mixture of surfactants having the formula:

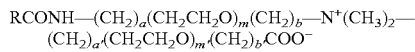

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$.

5. The method of claim 1 wherein said zwitterionic surfactant has the betaine structure:

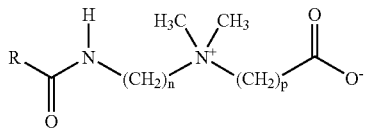

wherein R is a hydrocarbon group that may be branched or straight chained, aromatic, aliphatic or olefinic and has from about 14 to about 26 carbon atoms and may contain an amine; n=about 2 to about 4; and p=1 to about 5, and mixtures of these compounds.

6. The method of claim 5 wherein said betaine comprises oleylamidopropyl betaine.

7. The method of claim 5 wherein said betaine comprises erucylamidopropyl betaine.

8. The method of claim 5 wherein said fluid further comprises a co-surfactant.

9. The method of claim 1 wherein said viscoelastic surfactant comprises a cationic surfactant.

10. The method of claim 9 wherein said cationic surfactant comprises a surfactant or mixture of surfactants having the structure:

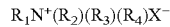

in which $R_1$ has from about 14 to about 26 carbon atoms and may be branched or straight chained, aromatic, saturated or unsaturated, and may comprise a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion; and mixtures of these compounds.

11. The method of claim 10 wherein $R_1$ comprises from about 18 to about 22 carbon atoms and may comprise a carbonyl, an amide, or an amine; $R_2$, $R_3$, and $R_4$ comprise from 1 to about 3 carbon atoms, and $X^-$ is a halide.

12. The method of claim 11 wherein $R_1$ comprises from about 18 to about 22 carbon atoms and may comprise a carbonyl, an amide, or an amine, and $R_2$, $R_3$, and $R_4$ are the same as one another and comprise from 1 to about 3 carbon atoms.

13. The method of claim 1 wherein said fluid further comprises a member selected from at least one of amines, alcohols, glycols, organic salts, chelating agents, solvents, mutual solvents, organic acids, organic acid salts, inorganic salts, oligomers, and mixtures of said members.

14. The method of claim 13 wherein said member is present at a concentration of between about 0.01 and about 10 percent.

15. The method of claim 13 wherein said member is present at a concentration of between about 0.01 and about 1 percent.

16. The method of claim 1 wherein said amphoteric surfactant comprises an amine oxide.

17. The method of claim 16 wherein said amine oxide comprises an amidoamine oxide.

18. The method of claim 1 wherein said rheology enhancer is present in said fluid at a concentration of from about 0.0001% to about 0.5%.

19. The method of claim 18 wherein said rheology enhancer is present in said fluid at a concentration of from about 0.0001% to about 0.05%.

20. The method of claim 1 wherein said rheology enhancer comprises a copolymer comprising at least one portion comprising partially hydrolyzed polyvinyl acetate having a percent hydrolysis between about 10% and about 95%.

21. The method of claim 20 wherein said rheology enhancer comprises partially hydrolyzed polyvinyl acetate having a molecular weight of from about 500 to about 100,000,000.

22. The method of claim 20 wherein said rheology enhancer comprises partially hydrolyzed polyvinyl acetate having a percent hydrolysis between about 30% and about 88%.

23. The method of claim 22 wherein said rheology enhancer comprises partially hydrolyzed polyvinyl acetate having a molecular weight of from about 500 to about 100,000,000.

24. The method of claim 1 wherein said partially hydrolyzed polyvinyl ester is selected from at least one of partially hydrolyzed $C_1$ to $C_{11}$ esters of polyvinyl alcohol.

25. The method of claim 1 wherein said fluid further comprises an acid selected from at least one of hydrochloric acid, hydrofluoric acid, formic acid, acetic acid, polylactic acid, polyglycolic acid, lactic acid, glycolic acid, sulfamic acid, malic acid, citric acid, tartaric acid, maleic acid, methylsulfamic acid, chloroacetic acid, and mixtures thereof.

26. The method of claim 1 wherein said rheology enhancer comprises an amphiphilic non-linear polymer having a structure selected from star, comb, dendritic, brush, graft, and star-branched.

27. The method of claim 1 wherein said rheology enhancer comprises a polymer having at least one portion comprising polyethylene oxide, polypropylene oxide, and mixtures thereof.

28. The method of claim 1 wherein said rheology enhancer comprises a copolymer selected from at least one of random, alternating, and block copolymers.

29. A method of shortening the shear recovery time of a fluid viscosified with a viscoelastic surfactant system comprising:
   a. providing a fluid comprising a viscoelastic surfactant having an entangled micelle structure selected from at least one of zwitterionic, amphoteric, and cationic surfactants and mixtures thereof, said entangled micelle structure being disrupted by application of shear and having a shear recovery time for said micelle structure to reheal;
   b. subjecting the fluid to high shear to reduce the viscosity of the fluid; and then reducing the shear for a period of time to recover the viscosity in the presence of rheology enhancer in a concentration sufficient to shorten the shear recovery time of said fluid, said rheology enhancer being a polymer comprising at least one portion selected from partially hydrolyzed polyvinyl esters.

30. A composition comprising a viscoelastic surfactant having an entangled micelle structure selected from at least one of zwitterionic, amphoteric, and cationic surfactants and mixtures thereof, fluid rheology comprising a reduced viscosity following high shear and a viscosity recovery time at reduced shear; and a rheology enhancer in a concentration sufficient to shorten the viscosity recovery time of said fluid, said rheology enhancer being a polymer comprising at least one portion selected from partially hydrolyzed polyvinyl esters.

* * * * *